US006797657B2

(12) United States Patent
Ellison et al.

(10) Patent No.: US 6,797,657 B2
(45) Date of Patent: Sep. 28, 2004

(54) TM-DOPED FLUOROPHOSPHATE GLASSES FOR 14XX AMPLIFIERS AND LASERS

(75) Inventors: Adam J.G. Ellison, Corning, NY (US); Lauren K. Cornelius, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/210,653

(22) Filed: Jul. 31, 2002

(65) Prior Publication Data

US 2004/0023786 A1 Feb. 5, 2004

(51) Int. Cl.$^7$ .......................... C03C 3/247; C03C 13/04; G02B 6/02

(52) U.S. Cl. .......................... 501/44; 501/37; 385/123; 359/341.5; 359/343

(58) Field of Search ............................. 501/44–48, 37; 359/333–349, 341.5; 385/123

(56) References Cited

U.S. PATENT DOCUMENTS

| | | | | |
|---|---|---|---|---|
| 5,313,477 A | * | 5/1994 | Esterowitz et al. | ............ 372/6 |
| 5,755,998 A | * | 5/1998 | Yamazaki et al. | .... 252/301.4 P |
| 6,556,342 B1 | * | 4/2003 | Ellison et al. | ............... 359/334 |
| 2003/0040421 A1 | * | 2/2003 | Margareyan | ................. 501/44 |

FOREIGN PATENT DOCUMENTS

JP    56045849 A  *  4/1981   ............. C03C/3/16

OTHER PUBLICATIONS

English Translation of JP 56–45849.*
Derwent Abstract 1981–43143D, Abstract of JP 56–045849.*
Kermaoui et al., "Chromium–thulium energy transfer in fluorophosphate glass", Eur. J. Solida State Inorg. Chem., t.25, 1988, pp. 305–322.
Reddy et al., "Absorption and photoluminescence spectra of $Tm^{3+}$ –doped fluorophosphate glasses", Spectrochimica Acta, vol. 48A, No. 10, pp. 1515–1521, 1992.
Lakshman et al., "Spectral Studies on the Fluorophosphate Glass Doped with Rare Earth Ions", Lanthanide and Actinide Research 2 (1998), pp. 243–252.
Kermaoui et al., "Spectroscopic Properties of $Tm^{3+}$ in Fluorophosphate Glasses", Journal of Luminescence 29 (1984), pp. 295–308.
Özen et al., "Excited state absorption mechanisms of red to UV and blue conversion luminescence in $Tm^{3+}$ doped fluorophosphate glass", Journal of Luminescence 63 (1995), pp. 85–96.
Özen et al., "Enhanced $Tm^{3+}$ blue emission in Tm, Yb, co–doped fluorophosphate glasses due to back energy transfer processes", Appl. Phys. Lett. 62 (9), Mar. 1, 1993, pp.928–930.

Iqbal et al., "Synthesis, characterization, and potential application of highly chemically durable glasses based on $AlF_3$", J. Mater Res., vol. 6, No. 2, Feb. 1991, pp. 401–406.
Tran et al., "Heavy Metal Fluoride Glasses and Fibers: A Review", Journal of Lightwave Technology, vol. LT–2, No. 5, Oct. 1984, pp. 566–586.
Özen et al., "Optical Properties and Upconverted Emissions of $Tm^{3+}$ in $Yb^{3+}$ Doped Fluorophosphate Glasses", J. Phys. Chem. Solids vol. 54, No. 11, pp. 1533–1542, 1993.
Kasamatsu et al., "Laser–diode pumping (1.4 and 1.56$\mu$m) of gain–shifted thulium fibre amplifier", Electronics Letters, $14^{th}$ Sep. 2000, vol. 36, No. 19, pp. 1607–1609.
Percival et al., "Diode pumped operation of thulium doped fluoride fibre amplifier suitable for first window systems", Electronics Letters, $15^{th}$ Sep. 1994, vol. 30, No. 19, pp. 1598–1599.
Komukai et al., "1.47 $\mu$m Band $Tm^{3+}$ Doped Fluoride Fibre Amplifier Using a 1.064 $\mu$m Upconversion Pumping Scheme", Electronics Letters, $7^{th}$ Jan. 1993, vol. 29, No. 1, pp. 110–112.
Kasamatsu et al., "Gain–Shifted Dual–Wavelength–Pumped Thulium–Doped Fiber Amplifier for WDM Signals in 1.48–1.51 —$\mu$m Wavelength Region", IEEE Photonics Technology Letters, vol. 13, No. 1, Jan. 2001, pp. 31–33.
Denker et al., "UV Luminescence in $Yb^{3+}$ —$Tm^{3+}$—$Gd^{3+}$ System Excited by IR Laser Diode", OSA TOPS, vol. 19 Advanced Solid State Lasers, pp.450–453.
Özen et al., Upconversion luminescence of $Tm^{3+}$ in $Yb^{3+}$ –doped fluorophosphate glasses under 683 nm excitation, Journal of Non–crystalline Solids 176 (1994), pp. 147–156.

* cited by examiner

Primary Examiner—Karl Group
Assistant Examiner—Elizabeth Bolden
(74) Attorney, Agent, or Firm—Svetlana Z. Short

(57) ABSTRACT

A host material for $Tm^{3+}$-doping is provided. The host material is a fluorophosphate glass having a non-zero concentration of $Tm^{3+}$, cation elements that include at least an alkaline earth, phosphorus, and aluminum, and anion elements that include oxygen (O) and fluorine (F). The fluorine (F)/oxygen (O) ratio (F/(F+O)) for the fluorophosphate glass of the embodiments of the present invention can be in the range of about 0.5 to about 0.85. The fluorophosphate glass further can have an alkali metal concentration of 10 mole % or less to improve durability. The Tm-doped fluorophosphate glass can be incorporated into an amplifier or laser utilized in the 14xx nm wavelength region.

22 Claims, 7 Drawing Sheets

TM-DOPED FLUOROPHOSPHATE GLASSES FOR 14XX AMPLIFIERS AND LASERS

BACKGROUND OF THE INVENTION

1. Field of the Invention

The invention relates generally to a glass composition, more particularly, to a $Tm^{3+}$-doped fluorophosphate glass material that provides amplification and/or laser action for at least one wavelength of light in the range of about 1450 nm to about 1530 nm.

2. Technical Background

In optical telecommunications networks, high bandwidth is desired for applications such as the Internet, video on demand, and videophone. In many optical communications systems, optical signals having wavelengths in the range 1530–1560 nanometers (nm) are utilized. This wavelength range corresponds to the "C-band" in telecommunications. This wavelength range also corresponds to a minimum attenuation region for silica and silica-based fibers.

Optical amplifiers are utilized to amplify the optical signals in those wavelength regions. Conventional optical amplifiers for telecommunications include erbium (Er)-doped silicate glass. The Er-doped silicate glass optical amplifier operates in the C-band and can also amplify optical signals in the 1570 nm -1620 nm range (also referred to as the L-band).

In order to increase optical bandwidth for telecommunications, more wavelengths will need to be transmitted. One wavelength range of interest is the 1450 nm–1530 nm wavelength band, often referred to as the "S-band." However, this wavelength band is outside of the Er-based material amplification range.

Within the 1450 nm–1530 nm wavelength band, trivalent thulium ($Tm^{3+}$) has an emission band centered at about 1480 nm, corresponding to the $^3F_4$-$^3H_4$ transition in $Tm^{3+}$. As there is some confusion in the literature as to the identity of the upper level of this transition (either $^3F_4$ or $^3H_4$), this transition will be referenced to herein as the "1480 nm transition" and the upper level will be referenced as the $^3F_4$ level. In order to generate a population in the upper $^3F_4$ energy level, for example, radiation at 780 nm to 800 nm is absorbed by the $Tm^{3+}$ material, whereby ions are transferred to the $^3F_4$ excited state from the $^3H_6$ ground state. Other types of pumping schemes, which rely on different energy transfer and up-conversion mechanisms, can also be utilized.

Attempts have been made to provide optical fibers that provide gain, amplification, or laser action for at least one wavelength of light in the range of about 1400 nm to about 1530 nm. The glass ZBLAN (an acronym for $\underline{Z}rF_4$—$\underline{B}aF_2$—$\underline{L}aF_3$—$\underline{A}lF_3$—$\underline{N}aF$) is one such example that provides for an increased lifetime (of 1 or more milliseconds) for the upper level of the 1480 nm transition. Fluoride glasses such as ZBLAN, however, have several undesirable properties as will be described below.

One problem with fluoride glasses is relatively low durability as compared to non-fluoride glasses (e.g. silica-based glass, antimony silicate glass). Hermetic packaging is thus required to increase the durability of ZBLAN because polyacrylate-coated ZBLAN fiber generally fails the stringent Telecordia specifications for durability under damp heat and temperature cycling without the hermetic packaging. Unfortunately, due to the high cost of hermetic packaging, efforts to commercialize fluoride glasses such as ZBLAN-based fiber have not been successful.

Another problem with fluoride glasses in general is that they are prone to devitrification (i.e., the break down of surface elements of the glass) during reheating, which is required in optical fiber formation. Thus, it follows that fluoride glasses are difficult to fabricate into long lengths of high-quality, high-strength fiber. ZBLAN-based fibers, for example, can have a strength as high as about 500 MPa to about 580 MPa, (70–80 kpsi) as compared to about 2000 MPa to about 3000 MPa for antimony silicate or Al-doped silica fibers. Furthermore, it is difficult to draw long lengths of fluoride glasses because small preform diameters are required, as fluoride glasses are generally too unstable to cast into large objects.

Another problem with ZBLAN is that zirconium is prone to reduction (which can result in the formation of metallic deposits on the surface of the glass) when melted under inert atmosphere (e.g., under argon or nitrogen). As a result, ZBLAN and related fluorozirconate and fluoroindate glasses must be melted under so-called reactive atmospheric conditions (e.g., in the presence of chlorine, $SF_4$, $SF_6$, etc.). Reactive atmospheric conditioned manufacturing processes, however, are generally very complex and expensive, as reactive atmospheres constrain the types of crucibles, heating elements, etc. that can be used to manufacture the optical fiber, and tend to limit the maximum size of the batch that can be handled.

Optical fibers based on antimony silicate (MCS) glasses have been developed as an alternative to ZBLAN. In MCS materials, $TM^{3+}$ ions are somewhat isolated from direct interactions with the silicate host glass by forming coordination environments consisting almost entirely of $SbO_x$ anions. Also, antimony is considerably heavier than silicon and forms slightly weaker bonds with oxygen than silicon. As a result, $Tm^{3+}$ emission lifetimes are lower, resulting in poor power conversion efficiency relative to ZBLAN.

At least one contributing factor to MCS fiber's relatively poor performance in the range of about 1450 nm to about 1530 nm is related to a phenomenon known as photodarkening. Photodarkening is produced by cascaded up-conversion (i.e., multiple absorption and promotion of electrons up to a plurality of electronic states) between equivalently spaced energy levels to higher energy levels. The cascaded upconversion in MCS fiber is strong in the range of about 1400 nm to about 1530 nm, whereby light in that wavelength band propagating along the optical fiber is absorbed. At the high pump power densities of, for example, single mode fibers operating in the 1400 nm to 1530 nm transmission wavelength band, cascaded up-conversion can lead to visible color center formation in the glass. These color centers manifest themselves as a large decrease in optical fiber transparency at very short wavelengths with a broad tail extending well into the infrared (IR) (i.e., at the desired propagation wavelength(s)).

Thus, a need exists for a low cost optical fiber having suitable 1450 nm to 1530 nm emission lifetimes, yet also with sufficient thermal stability and durability, as well as minimized photodarkening characteristics.

SUMMARY OF THE INVENTION

In one aspect of the present invention, a glass material comprises a fluorophosphate glass having a non-zero concentration of $Tm^{3+}$. The fluorophosphate glass further includes cation elements that include at least an alkaline earth, phosphorus, and aluminum, and anion elements that include oxygen (O) and fluorine (F). In the fluorophosphate glass, a ratio of F/(F+O) is in the range of about 0.50 to about 0.8.

In another aspect of the present invention, a fluorophosphate glass composition comprises about 13 cation % to about 26 cation % P, less than about 10 mol % alkali metal halide, and a concentration of $Tm^{3+}$ ions at an amount where the lifetime of an upper level for a 1480 nm transition is at least about 350 μs.

In another aspect of the present invention, an alkali-free fluorophosphate glass is provided having a concentration of $Tm^{3+}$ ions at an amount where the lifetime of an upper level for a 1480 nm transition is at least about 350 μs.

In another aspect of the present invention, an alkali-free fluorophosphate glass comprises about 13 cation % to about 26 cation % P, and about 40 cation % to about 75 cation % R, where R comprises at least one alkaline earth selected from at least one of Mg, Ca, Sr, and Ba. The fluorophosphate glass further comprises about 13 cation % to about 40 cation % Al, and 0.001 cation % to about 0.5 cation % Tm.

In another aspect of the present invention, an optical amplifier is provided that comprises a Tm-doped fluorophosphate glass having the constituents described above.

The present invention provides Tm-doped compositions that enable the construction of optical fibers having suitable 1450–1530 nm emission lifetimes, acceptable thermal stability and durability, and mimimal photodarkening characteristics. Other advantages and novel features of the present invention will become apparent from the following detailed description of the invention when considered in conjunction with the accompanying drawings.

BRIEF DESCRIPTION OF THE DRAWINGS

The foregoing advantages and features of the invention will become apparent upon reference to the following detailed description and the accompanying drawings, of which.

DETAILED DESCRIPTION OF EXEMPLARY EMBODIMENTS

Reference will now be made in detail to presently preferred embodiments of the invention. Wherever possible, the same reference numbers will be used throughout the drawings to refer to the same or like parts.

The present invention relates to a Tm-doped fluorophosphate glass composition that can be utilized as a gain medium, wide band optical amplifier, and/or laser source in the 14xx nm wavelength region, more particularly, the 1450 nm–1530 nm wavelength band (S-band).

The inventors have determined that particular fluorophosphate glasses can act as a suitable host material for $Tm^{3+}$. The Tm-doped fluorophosphate glass material has acceptably low phonon energy characteristics and can be processed in a straightforward manner. In particular, according to the embodiments of the present invention, the inventors have determined that a fluorophosphate glass having small or no alkali metal content provides a more durable and practical host material for the $Tm^{3+}$ 1480 nm wavelength transition for gain, amplification, and/or laser action purposes because of acceptable lifetime characteristics, sufficient emission band width and good chemical durability, as compared to other fluoride-based glasses and even fluorophosphate glasses having higher alkali content.

In addition, the fluorophosphate glass compositions of the embodiments of the present invention provide reduced photodarkening effects, with absorption band edges deeper in the UV, similar to ZBLAN. The inventors have found that alternatives to ZBLAN, such as MCS fibers doped with $Tm^{3+}$, tend to photodarken when pumped in the infrared due to cascaded up-conversion from lower energy levels to energy levels in the vacuum UV.

According to a first embodiment of the present invention, a host material for Tm-doping is provided. The host material is a fluorophosphate glass having a non-zero concentration of $Tm^{3+}$, cation elements that include at least an alkaline earth, phosphorus, and aluminum, and anion elements that include oxygen (O) and fluorine (F). The cation and anion elements are introduced into the glass material in the form of compounds (e.g., $P_2O_5$, $AlF_3$, etc.) as described below. The inventors have determined that the fluorine (F)/oxygen (O) ratio (F/(F+O)) for the fluorophosphate glass of the embodiments of the present invention can be in the range of about 0.4 to about 0.9, in the range of about 0.50 to about 0.85, in the range of about 0.5 to about 0.8, and also in the range of about 0.55 to about 0.8.

The inventors have determined that the F/F+O ratio range provides a helpful parameter in optimizing glass compositions to yield glasses with good quality and chemical durability. By using the F/F+O ratio, the relative concentrations of all of the cations of the composition (e.g., P, Al, Mg, etc.) can be frozen while the relative proportions of F and O can be independently varied, while still obtaining a glass of sufficient quality. For example, the compositions and have the same relative proportions of P, Al, Ca and Sr, but different concentrations of F and O. While both compositions yield good glasses, the final glass can be formed independently of the source materials used to make it. For example, alternative starting materials can include aluminum metaphosphate $(Al(PO_3)_3)$, $P_2O_5+Al_2O_3$, orthophosphates (e.g., $Ca_3(PO_4)_2$), or metaphosphates (e.g., $Ca(PO_3)_2$). Alternatively, alkaline earths can be added as oxides or a mix of oxides and fluorides, provided that the final composition is consistent with limits described herein. According to an embodiment of the present invention, for the same cation constituents, effective, quality glasses are obtained for an F/(F+O) ratio between about 0.50 and 0.85, for an F/(F+O) ratio between about 0.5 and 0.8, and for an F/(F+O) ratio between 0.55 and 0.8. When the F/(F+O) ratio is much higher, glass stability can be effected. When the ratio is much lower, the glasses can become more difficult to melt, and can eventually affect glass stability. Other effects may include changing Tm lifetime values and the movement of the UV absorption edge to longer wavelengths with increasing oxygen concentration.

According to the embodiments of the present invention, the Tm-doped fluorophosphate glass has the following optical characteristics. The Tm-doped fluorophosphate glass has a lifetime for the upper level of the 1480 nm transition of at least about 350 $\mu$s to about 1.5 ms. The bandwidth of the 1480 nm transition can be fairly broad, extending from about 1410 nm to about 1510 nm (full width half maximum, or FWHM), as discussed in more detail below. Further, concentration levels of Tm and/or other host constituents can be selected to provide either longer lifetimes for the 1480 nm transition, or broader emission band width for the 1480 nm transition. The Tm-doped fluorophosphate glass has an absorption from the ground state to the upper level of the 1480 nm transition at about 770 nm to about 810 nm, suitable for pumping by conventional laser diodes e.g., commercially available AlGaAs diode lasers. In addition, as discussed below, the absorption characteristics of the Tm-doped fluorophosphate glass show an absorption band edge in the ultraviolet (UV) at about 240 nm or less, similar to that for ZBLAN, and an improvement over MCS.

The composition of the fluorophosphate glass according to the embodiments of the present invention is described below and is shown in the accompanying tables.

The $Tm^{3+}$ ion can be introduced into the fluorophosphate glass composition as a particular concentration of e.g., $Tm_2O_3$ or $TmF_3$ (or the like). The $Tm^{3+}$ dopant concentration can be from about 0.001 cation % to about 0.5 cation %, with a preferred concentration being from about 0.001 cation % to about 0.25 cation %. For example, acceptable results can occur for Tm concentrations of about 0.005 cation % to about 0.15 cation %.

In a first embodiment, no alkali (A) elements are incorporated in the fluorophosphate glass host (i.e., resulting in an "alkali-free" fluorophosphate glass). The term "alkali-free" used infra encompasses formed glasses that have no more than trace amounts of alkalis, which may occur due to the purity levels of the starting material compounds, the growth environment (crucibles, furnaces), etc. In another embodiment, the amount of alkalis incorporated in the fluorophosphate host is selected to be about 10 cation % or less, in order to maintain the durability of the resulting fluorophosphate glass. The relationship between glass durability versus alkali concentration is shown below in FIG. 5, and is further described in detail below.

According to this first embodiment, one or more of the following groups of materials is incorporated into the fluorophosphate glass host material. First, phosphorus (P) is included in the fluorophosphate glass. Phosphorus can be incorporated into the fluorophosphate glass using, e.g., $P_2O_5$ and/or other phosphorus-containing starting materials (e.g., $Al(PO_3)_3$, $Ca_3(PO_4)_2$, and $Ca(PO_3)_2$, to name a few). Conceivably, phosphorus can be added as an acid (e.g., $H_3PO_4$ or $D_3PO_4$), with an additional calcination step to drive off water. A preferred range in concentration of P incorporated in the fluorophosphate glass include about 13 cation % to about 26 cation % P.

Second, one or more alkaline earth elements are included in the fluorophosphate glass. Alkaline earths can be incorporated into the fluorophosphate glass using, e.g., $BaF_2$, $MgF_2$, $CaF_2$, $SrF_2$ (and/or BaO, MgO, CaO, SrO, $BaCl_2$, $MgCl_2$, $CaCl_2$, $SrCl_2$, and/or $BaBr_2$, $MgBr_2$, $CaBr_2$, $SrBr_2$) or combinations thereof. Preferably, an alkaline earth (R) fluoride (F) compound, designated herein as $RF_2$, is incorporated in the fluorophosphate glass. In one aspect, $RF_2$ comprises one or both of $CaF_2$ and $SrF_2$, although $BaF_2$ and $MgF_2$, separately or in combination, can also be incorporated in the fluorophosphate glass as well. However, as discussed above, the cation amount can be frozen, while independently varying the F/F+O ratio. Preferred ranges in concentration of R incorporated in the fluorophosphate glass include about 40 cation % to about 70 cation % and about 44 cation % to about 65 cation %.

The alkaline-earth compounds can help provide better chemical durability for the fluorophosphate host. One such stable glass comprises $9P_2O_5$-$3Al_2O_3$-$28AlF_3$-$10MgF_2$-$30CaF_2$-$10SrF_2$-$10BaF_2$. Experiments showing glass stability are further discussed below.

In addition, the alkaline earth fluorides can help increase the lifetime of the Tm emission, which can increase the efficiency of optical amplification and/or laser action.

Third, aluminum (Al) (in the form of $Al_2O_3$ (starting material, alternatively written as $AlO_{1.5}$), and/or $AlF_3$ (starting material), either separately or in combination) can be included in the fluorophosphate glass. Other starting materials that can be used include $AlPO_4$, $Al(PO_3)_3$, $CaAl_2O_4$, $CaAl_4O_7$, and aluminates of other alkaline earths such as $MgAl_2O_4$. If the batches are calcined under flowing oxygen, then $AlF_3 \cdot 6H_2O$, $AlCl_3 \cdot 6H_2O$ or $Al(NO_3)_3 \cdot 6H_2O$ or analogous bromides, iodides, etc. could also be used. For example, $Al_2O_3/AlO_{1.5}$ and/or $AlF_3$ can be incorporated in suitable amounts to increase durability, and/or to modify decrease the fluorophosphate glass index of refraction, if used in appropriate amounts. Preferred ranges in concentration of Al include about 13 cation % to about 40 cation % Al, where $Al_2O_3/AlO_{1.5}$ and/or $AlF_3$ can be incorporated in the fluorophosphate glass at amounts from about 5 molar % to about 50 molar % $Al_2O_3/AlO_{1.5}$+$AlF_3$, and about 10 molar % to about 48 molar % $Al_2O_3/AlO_{1.5}$+$AlF_3$ (with about 0–11 molar % $AlO_{1.5}$ and about 8 molar % to about 40 molar % $AlF_3$).

In an alternative embodiment, the fluorophosphate glass can further include an additional rare earth (RE) element or elements. Preferably, the additional rare earth element(s) are selected from optically inactive rare earth elements, such as La, Y, Gd, and Lu (which exhibit little or no infrared (IR) absorption), and are incorporated into the fluorophosphate glass in the form $(RE)F_3$. In a further alternative embodiment, the fluorophosphate glass can include glass former elements such as heavy metals (e.g. Pb, Cd, and/or Bi) in fluoride or oxide compounds to provide increased glass stability, a modified index, and/or gain shaping. For this alternative embodiment, requirements as to photodarkening should be relaxed as elements such as Pb can result in increased photodarkening effects.

In accordance with one aspect of the present invention, suitable fluorophosphate glasses can be made as follows with the following as-batched composition range: x $(3P_2O_5$+$Al_2O_3)$+$(40-x)$ $AlF_3$+10 $MgF_2$+30 $CaF_2$+10 Ba $F_2$+0.1 $TmF_3$, with x being a variable amount. Of course, other suitable compositions in accordance with the present invention may also be utilized, as is apparent from the description herein.

Table I summarizes some preferred ranges of concentrations of the aforementioned fluorophosphate glass composition constituents based on the description above and the experimental results provided below.

TABLE I

| | Preferred ranges | | | |
|---|---|---|---|---|
| | Preferred Minimum | Preferred Maximum | More Preferred Minimum | More Preferred Maximum |
| P | 10 cation % | 36 cation % | 13 cation % | 26 cation % |
| Al (with oxide) | 0 | 23 cation % | 0 | 11 cation % |
| Al (with fluoride) | 5 cation % | 50 cation % | 13 cation % | 40 cation % |
| Total Al | 5 cation % | 50 cation % | 13 cation % | 40 cation % |
| Total A (alkalis) | 0 | 10 cation % | 0 | 0 |
| Mg | 0 | 75 cation % | 0 | 20 cation % |
| Ca | 0 | 75 cation % | 10 cation % | 55 cation % |
| Sr | 0 | 75 cation % | 5 cation % | 70 cation % |
| Ba | 0 | 75 cation % | 0 | 30 cation % |
| Tm | 0.001 cation % | 0.5 cation % | 0.001 cation % | 0.25 cation % |
| F/(F + O) | 0.5 | 0.85 | 0.55 | 0.8 |
| Total R | 40 cation % | 75 cation % | 44 cation % | 65 cation % |
| (Mg + Ba)/R | 0 | 0.75 | 0 | 0.5 |
| R/(R + P) | | | 0 | 0.82 |
| (RE)F$_3$ | 0 | 12 mol % | 0 | 7 mol % |
| PbF$_2$, CdF$_2$ | 0 | 8 mol % | 0 | 4 mol % |

EXPERIMENTS

1. Fabrication

In accordance with the Tm$^{3+}$-doped fluorophosphate glass compositions described above, many variations of component concentrations were tested and samples produced. The following Tables II, III, and IV list component concentrations for example glasses which are suitable for fiber/waveguide applications, including fiber amplifiers and lasers. Tables II and III list constituents in terms of the starting materials (in mol %). Table IV lists constituents in terms of cation % or ratio value. By listing constituents in cation %, the independent variability of the F/(F+O) ratio is more readily apparent.

The glasses were made as follows. The fluorides were weighed into a 100 mL glass bottle with a plastic lid. For example, a particular sample (having a similar as-batched composition to the following: x (3P$_2$O$_5$+Al$_2$O$_3$)+(40−x) AlF$_3$+10 MgF$_2$+30CaF$_2$+10 SrF$_2$+10 BaF$_2$+0.1 TmF$_3$) included 2.7 grams of 99% aluminum metaphosphate Al(PO$_3$)$_3$; 16.1 grams of 99.999% aluminum fluoride AlF$_3$; 3.2 grams of 99% magnesium fluoride MgF$_2$; 11.3 grams of 99% calcium fluoride CaF$_2$; 6.5 grams of 99% strontium fluoride TmF$_3$; 9.9 grams of 99% barium fluoride BaF$_2$; and 0.1 grams of 99.9% thulium fluoride TmF$_3$. Once weighed into the bottle, the lid was firmly attached and the sample thoroughly mixed. Appropriate mixing methods include, but are not limited to: roller mill at 50 rpm for one hour; or Turbula mixing (Willy A. Bachofen A G Maschinenfabrik, Type T2C) for 15 minutes. The bottle was then transferred into a 50 mL vitreous carbon crucible. Alternatively, a graphite crucible can also be used. The sample can be tamped down with a ceramic or glass rod to ensure that it all fits in the crucible if needed.

The sample was then melted as follows. The melting furnace was pre-heated to 925° C. The furnace can either be purged with an inert gas or can be in a glove box or glove bag purged with an inert gas such that oxygen levels remain less than about 0.5%. Though nitrogen is a preferred inert gas due to its low cost and availability, argon or helium atmospheres can also suffice, as would reactive atmospheres such as 5% Cl$_2$/95% Ar and others, as would be readily apparent to one skilled in the art. However, a reactive atmosphere is not required to produce acceptable fluorophosphate glasses in accordance with the embodiments of the present invention.

An annealing furnace was then pre-heated to 225° C. It is optional that the annealing furnace can be purged with an inert atmosphere. The sample in the crucible was then transferred to the furnace. After 30 minutes, the crucible was removed and the melt swirled to ensure homogeneity. The sample was then returned to the furnace for an additional 30 minutes of melting. After this time, the crucible was then removed from the furnace and swirled one more time. While the melt was slightly incandescent (i.e., dull red), the melt was poured into a steel, brass, or carbon (e.g., graphite) mold. Once the glass responded elastically when tapped with a glass rod, it was then transferred to the annealing furnace. After 1 hour, the annealing furnace was cooled to room temperature. Once cooled, the sample was then removed for analysis. Other methods of forming these glasses will be apparent to those of ordinary skill in the art given the present description.

In addition, the Tm-doped fluorophosphate glass is amenable to fiberization. For example, in a first trial, the inventors cast a bar of the composition:

9 P$_2$O$_5$+3 Al$_2$O$_3$+28 AlF$_3$+10 MgF$_2$+30CaF$_2$+10SrF$_2$+10 BaF$_2$.

and polished into a rod approximately 6 mm in diameter and 20 cm in length. The bar was drawn to fiber at approximately 700° C. in a graphite resistance furnace using conventional draw equipment. As the glasses are stable, conventional methods for producing preforms work with the glasses of the present invention.

As a second example, the inventors made core and clad glasses of the following compositions:

clad=11.25 P$_2$O$_5$+3.75 Al$_2$O$_3$+25 AlF$_3$+10 MgF$_2$+30 CaF$_2$10 SrF$_2$+10 BaF$_2$;

and core=15.75 P$_2$O$_5$+5.25 Al$_2$O$_3$+19 AlF$_3$+8 MgF$_2$+30 CaF$_2$+10 SrF$_2$+8 BaF$_2$+4 YF$_3$+0.1 TmF$_3$.

An inner crucible was prepared by tapering one end of a 6 mm ID×8 mm OD tube of Hereaus F320 silica and grinding the tip to a diameter of 0.4 mm. An outer crucible was prepared by tapering the end of a 28 mm ID×32 mm OD tube of Hereaus F320 silica and grinding the tip to a diameter of 3 mm. The tubes were mounted to a fixture so that their orifices were concentric and the orifice of the inner crucible was above that of the outer crucible. The core and clad were loaded into the inner and outer crucibles (respectively) and core-clad fiber was obtained at a draw temperature of about 720° C.

As a third example, the inventors made a clad glass of the composition:

clad=11.25 $P_2O_5$+3.75 $Al_2O_3$+25 $AlF_3$+10 $MgF_2$+30 $CaF_2$+10 $SrF_2$+10 $BaF_2$, and loaded it into a 28×32 mm tube of Hereaus F320 silica with the bottom sealed off entirely. The glass was heated to approximately 720° C. and a silica rod was lowered into the melt to draw up a gob. A fiber formed below the gob and was tractored and drawn for about 30 minutes.

These examples illustrate that the glasses of the present invention can be drawn into fiber using many different methods.

2. Example Compositions

As noted above, alternative preferred embodiments of the fluorophosphate glass of the present invention can be alkali-free or can contain about 10 mole % or less alkali metal concentration. In Tables II and III, preferable compositions and suitable ranges for individual constituents are provided. The concentrations are listed in mole percent, as calculated. These tables merely indicate preferred compositions, and are provided for example only. Thus, these tables are not intended to be limiting on the scope of the invention.

TABLE II

Example alkali-free compositions (mol %)

| | Sample 1-A | Sample 2-A | Sample 3-A | Sample 4-A | Sample 5-A | Sample 6-A | Sample 7-A |
|---|---|---|---|---|---|---|---|
| $P_2O_5$ | 3 | 5 | 7 | 9.5 | 13.5 | 3.9 | 7 |
| $Al_2O_3/AlO_{1.5}$ | 1 | 1.5 | 2.5 | 3.2 | 4.5 | 1.3 | 2.3 |
| $AlF_3$ | 37 | 36.1 | 24 | 17.5 | 18.2 | 36.5 | 29 |
| $MgF_2$ | 10 | 9 | 11 | 21.5 | 10.5 | 10 | 5 |
| $CaF_2$ | 28 | 29 | 33 | 21.5 | 32 | 25 | 27.5 |
| $SrF_2$ | 10 | 9 | 11 | 13 | 10.5 | 7 | 8 |
| $BaF_2$ | 10.9 | 10 | 11.2 | 13.3 | 10.5 | 15.2 | 14 |
| $YF_3$ | 0 | 0 | 0 | 0 | 0 | 1 | 7 |
| Tm | 0.1 | 0.4 | 0.3 | 0.5 | 0.2 | 0.1 | 0.2 |

TABLE III

Example compositions with small concentration of alkali fluorides (mol %)

| | Sample 8-A | Sample 9-A | Sample 10-A | Sample 11-A | Sample 12-A | Sample 13-A | Sample 14-A |
|---|---|---|---|---|---|---|---|
| $P_2O_5$ | 5.8 | 5.8 | 5.8 | 7.7 | 7.7 | 13.6 | 13.6 |
| $Al_2O_3/AlO_{1.5}$ | 1.9 | 1.9 | 1.9 | 2.6 | 2.6 | 4.5 | 4.5 |
| $AlF_3$ | 31 | 30.5 | 31 | 33 | 33 | 18.5 | 27 |
| LiF | 3.8 | 0 | 0 | 0 | 0 | 0 | 0 |
| NaF | 3.8 | 12 | 11.5 | 10 | 29 | 9 | 18 |
| KF | 0 | 0 | 7.5 | 0 | 0 | 0 | 0 |
| $MgF_2$ | 8 | 7 | 26 | 9.5 | 5 | 9 | 6 |
| $CaF_2$ | 27 | 27 | 7 | 15 | 5 | 27 | 17.8 |
| $SrF_2$ | 8 | 7 | 9 | 9.5 | 5 | 9 | 6 |
| $BaF_2$ | 10.5 | 8.5 | 0 | 12.5 | 12.5 | 9 | 7 |
| Tm | 0.2 | 0.3 | 0.3 | 0.2 | 0.2 | 0.4 | 0.1 |

As the inventors have determined, a fluorophosphate glass having one or both of $SrF_2$ and $CaF_2$ provides suitable a glass material. For example, with about 55% $CaF_2$ and 5% $SrF_2$ (or $BaF_2$), glasses can be formed that scale up to about 500 g, which is a large amount for a fluoride glass material. In addition, glass stability can be optimized when the concentration of $P_2O_5$ is selected in an amount from about 7 mole % to about 11 mole % (with about 9 mole % $P_2O_5$ being most preferred). For amounts of $P_2O_5$ greater than about 18 mole %, stability of the glass can become less consistent.

In Table IV, additional alkali-free glass compositions were made. In Table IV, constituents are listed in cation %, thus indicating the independent variability of the F/(F+O) ratio. It is noted that the third column ("Al") indicates Al incorporated from an oxide starting material and the fourth column (also labeled "Al") indicates Al incorporated from fluoride starting materials. It is also noted that some samples listed in Table IV contain a zero concentration of Tm. These samples were made to test the efficacy of the host. It will be apparent to one of ordinary skill in the art given the present description that Tm can be incorporated in such compositions in the manner described herein.

TABLE IV

Additional Alkali-Free Compositions

| | P | Al (oxide) | Al (fluoride) | Mg | Ca | Sr | Ba | Tm | F/F + O | R (total) | Al (total) |
|---|---|---|---|---|---|---|---|---|---|---|---|
| Min | 13.08 | 0.00 | 7.44 | 0.00 | 0.00 | 0.00 | 0.00 | 0.00 | 0.630 | 44.35 | 13.04 |
| Max | 26.09 | 23.08 | 35.75 | 18.75 | 54.55 | 53.57 | 26.79 | 0.45 | 0.821 | 64.29 | 39.29 |
| 1 | 13.08 | 5.61 | 21.50 | 9.96 | 29.91 | 9.97 | 9.97 | 0.00 | 0.821 | 59.81 | 27.10 |
| 2 | 13.08 | 5.61 | 30.84 | 8.41 | 25.23 | 8.41 | 8.41 | 0.00 | 0.794 | 50.47 | 36.45 |
| 3 | 13.64 | 4.55 | 27.27 | 0.00 | 54.55 | 0.00 | 0.00 | 0.00 | 0.800 | 54.55 | 31.82 |
| 4 | 14.29 | 7.14 | 25.00 | 0.00 | 53.57 | 0.00 | 0.00 | 0.00 | 0.789 | 53.57 | 32.14 |
| 5 | 14.29 | 7.14 | 25.00 | 8.93 | 26.79 | 8.93 | 8.93 | 0.00 | 0.789 | 53.57 | 32.14 |
| 6 | 14.29 | 7.14 | 26.79 | 8.63 | 25.89 | 8.63 | 8.63 | 0.00 | 0.784 | 51.79 | 33.93 |
| 7 | 14.29 | 7.14 | 28.57 | 8.33 | 25.00 | 8.33 | 8.34 | 0.00 | 0.778 | 50.00 | 35.71 |
| 8 | 14.29 | 7.14 | 23.22 | 9.22 | 27.68 | 9.22 | 9.22 | 0.00 | 0.795 | 55.35 | 30.36 |
| 9 | 14.81 | 5.56 | 29.63 | 8.33 | 25.00 | 8.33 | 8.33 | 0.00 | 0.771 | 50.00 | 35.19 |
| 10 | 15.65 | 7.83 | 24.35 | 0.00 | 52.17 | 0.00 | 0.00 | 0.00 | 0.769 | 52.17 | 32.17 |
| 11 | 15.79 | 8.77 | 14.04 | 10.23 | 30.70 | 10.24 | 10.24 | 0.00 | 0.795 | 61.40 | 22.81 |
| 12 | 16.07 | 5.36 | 22.32 | 0.00 | 16.88 | 22.50 | 16.88 | 0.09 | 0.778 | 56.25 | 27.68 |
| 13 | 16.07 | 5.36 | 22.32 | 0.00 | 28.13 | 16.88 | 11.25 | 0.09 | 0.778 | 56.25 | 27.68 |
| 14 | 16.07 | 5.36 | 22.32 | 0.00 | 46.88 | 0.00 | 9.38 | 0.09 | 0.778 | 56.25 | 27.68 |
| 15 | 16.07 | 5.36 | 22.32 | 0.00 | 46.88 | 9.38 | 0.00 | 0.09 | 0.778 | 56.25 | 27.68 |
| 16 | 16.07 | 5.36 | 23.21 | 9.22 | 27.68 | 9.22 | 9.23 | 0.00 | 0.775 | 55.36 | 28.57 |

TABLE IV-continued

Additional Alkali-Free Compositions

| | P | Al (oxide) | Al (fluoride) | Mg | Ca | Sr | Ba | Tm | F/F + O | R (total) | Al (total) |
|---|---|---|---|---|---|---|---|---|---|---|---|
| 17 | 16.07 | 5.36 | 25.00 | 0.00 | 0.00 | 44.64 | 8.93 | 0.00 | 0.769 | 53.57 | 30.36 |
| 18 | 16.07 | 5.36 | 25.00 | 0.00 | 0.00 | 53.57 | 0.00 | 0.00 | 0.769 | 53.57 | 30.36 |
| 19 | 16.07 | 5.36 | 25.00 | 0.00 | 0.00 | 26.79 | 26.79 | 0.00 | 0.769 | 53.57 | 30.36 |
| 20 | 16.07 | 5.36 | 25.00 | 16.07 | 0.00 | 37.50 | 0.00 | 0.00 | 0.769 | 53.57 | 30.36 |
| 21 | 16.07 | 5.36 | 25.00 | 4.46 | 0.00 | 49.11 | 0.00 | 0.00 | 0.769 | 53.57 | 30.36 |
| 22 | 16.07 | 5.36 | 25.00 | 8.93 | 0.00 | 44.64 | 0.00 | 0.09 | 0.769 | 53.57 | 30.36 |
| 23 | 16.07 | 5.36 | 25.00 | 0.00 | 4.46 | 49.11 | 0.00 | 0.00 | 0.769 | 53.57 | 30.36 |
| 24 | 16.07 | 5.36 | 25.00 | 0.00 | 5.36 | 26.79 | 21.43 | 0.00 | 0.769 | 53.57 | 30.36 |
| 25 | 16.07 | 5.36 | 25.00 | 5.36 | 5.36 | 42.86 | 0.00 | 0.09 | 0.769 | 53.57 | 30.36 |
| 26 | 16.07 | 5.36 | 25.00 | 0.00 | 8.93 | 44.64 | 0.00 | 0.00 | 0.769 | 53.57 | 30.36 |
| 27 | 16.07 | 5.36 | 25.00 | 0.00 | 10.71 | 21.43 | 21.43 | 0.09 | 0.769 | 53.57 | 30.36 |
| 28 | 16.07 | 5.36 | 25.00 | 0.00 | 10.71 | 42.86 | 0.00 | 0.09 | 0.769 | 53.57 | 30.36 |
| 29 | 16.07 | 5.36 | 25.00 | 0.00 | 16.07 | 16.07 | 21.43 | 0.00 | 0.769 | 53.57 | 30.36 |
| 30 | 16.07 | 5.36 | 25.00 | 0.00 | 16.07 | 21.43 | 16.07 | 0.09 | 0.769 | 53.57 | 30.36 |
| 31 | 16.07 | 5.36 | 25.00 | 17.68 | 17.68 | 18.21 | 0.00 | 0.09 | 0.769 | 53.57 | 30.36 |
| 32 | 16.07 | 5.36 | 25.00 | 0.00 | 21.43 | 16.07 | 16.07 | 0.09 | 0.769 | 53.57 | 30.36 |
| 33 | 16.07 | 5.36 | 25.00 | 8.93 | 26.79 | 8.93 | 8.93 | 0.09 | 0.769 | 53.57 | 30.36 |
| 34 | 16.07 | 5.36 | 25.00 | 8.93 | 26.79 | 8.93 | 8.93 | 0.27 | 0.769 | 53.57 | 30.36 |
| 35 | 16.07 | 5.36 | 25.00 | 8.93 | 26.79 | 8.93 | 8.93 | 0.45 | 0.769 | 53.57 | 30.36 |
| 36 | 16.07 | 5.36 | 25.00 | 0.00 | 26.79 | 0.00 | 26.79 | 0.00 | 0.769 | 53.57 | 30.36 |
| 37 | 16.07 | 5.36 | 25.00 | 0.00 | 26.79 | 10.71 | 16.07 | 0.09 | 0.769 | 53.57 | 30.36 |
| 38 | 16.07 | 5.36 | 25.00 | 0.00 | 26.79 | 16.07 | 10.71 | 0.09 | 0.769 | 53.57 | 30.36 |
| 39 | 16.07 | 5.36 | 25.00 | 0.00 | 26.79 | 26.79 | 0.00 | 0.00 | 0.769 | 53.57 | 30.36 |
| 40 | 16.07 | 10.71 | 19.64 | 8.93 | 26.79 | 8.93 | 8.93 | 0.00 | 0.769 | 53.57 | 30.36 |
| 41 | 16.07 | 5.36 | 25.00 | 0.00 | 32.14 | 0.00 | 21.43 | 0.00 | 0.769 | 53.57 | 30.36 |
| 42 | 16.07 | 5.36 | 25.00 | 10.71 | 32.14 | 10.71 | 0.00 | 0.09 | 0.769 | 53.57 | 30.36 |
| 43 | 16.07 | 5.36 | 25.00 | 16.07 | 37.50 | 0.00 | 0.00 | 0.00 | 0.769 | 53.57 | 30.36 |
| 44 | 16.07 | 5.36 | 25.00 | 0.00 | 44.64 | 0.00 | 8.93 | 0.09 | 0.769 | 53.57 | 30.36 |
| 45 | 16.07 | 5.36 | 25.00 | 0.00 | 44.64 | 8.93 | 0.00 | 0.09 | 0.769 | 53.57 | 30.36 |
| 46 | 16.07 | 5.36 | 25.00 | 8.93 | 44.64 | 0.00 | 0.00 | 0.09 | 0.769 | 53.57 | 30.36 |
| 47 | 16.07 | 5.36 | 25.00 | 4.46 | 49.11 | 0.00 | 0.00 | 0.00 | 0.769 | 53.57 | 30.36 |
| 48 | 16.07 | 5.36 | 25.00 | 0.00 | 53.57 | 0.00 | 0.00 | 0.09 | 0.769 | 53.57 | 30.36 |
| 49 | 16.07 | 13.39 | 16.96 | 8.93 | 26.79 | 8.93 | 8.93 | 0.00 | 0.769 | 53.57 | 30.36 |
| 50 | 16.07 | 5.36 | 26.79 | 6.25 | 24.11 | 16.96 | 4.46 | 0.00 | 0.763 | 51.79 | 32.14 |
| 51 | 16.07 | 5.36 | 26.79 | 7.14 | 26.79 | 8.93 | 8.93 | 0.09 | 0.763 | 51.79 | 32.14 |
| 52 | 16.07 | 5.36 | 27.68 | 0.00 | 0.00 | 42.41 | 8.48 | 0.09 | 0.760 | 50.89 | 33.04 |
| 53 | 16.07 | 5.36 | 27.68 | 0.00 | 5.09 | 25.45 | 20.36 | 0.09 | 0.760 | 50.89 | 33.04 |
| 54 | 16.07 | 5.36 | 27.68 | 0.00 | 10.18 | 20.36 | 20.36 | 0.09 | 0.760 | 50.89 | 33.04 |
| 55 | 16.07 | 5.36 | 27.68 | 0.00 | 12.72 | 25.45 | 12.72 | 0.09 | 0.760 | 50.89 | 33.04 |
| 56 | 16.07 | 5.36 | 27.68 | 0.00 | 15.27 | 15.27 | 20.36 | 0.09 | 0.760 | 50.89 | 33.04 |
| 57 | 16.07 | 5.36 | 27.68 | 0.00 | 25.45 | 25.45 | 0.00 | 0.09 | 0.760 | 50.89 | 33.04 |
| 58 | 16.07 | 5.36 | 27.68 | 0.00 | 42.41 | 0.00 | 8.48 | 0.09 | 0.760 | 50.89 | 33.04 |
| 59 | 16.07 | 5.36 | 27.68 | 0.00 | 42.41 | 8.48 | 0.00 | 0.09 | 0.760 | 50.89 | 33.04 |
| 60 | 16.07 | 5.36 | 28.57 | 8.33 | 25.00 | 8.33 | 8.34 | 0.00 | 0.757 | 50.00 | 33.93 |
| 61 | 16.07 | 5.36 | 28.57 | 5.36 | 26.79 | 8.93 | 8.93 | 0.09 | 0.757 | 50.00 | 33.93 |
| 62 | 16.07 | 5.36 | 30.36 | 3.57 | 26.79 | 8.93 | 8.93 | 0.09 | 0.750 | 48.21 | 35.71 |
| 63 | 16.07 | 5.36 | 32.14 | 1.79 | 26.79 | 8.93 | 8.93 | 0.09 | 0.743 | 46.43 | 37.50 |
| 64 | 16.07 | 5.36 | 33.93 | 0.00 | 26.79 | 8.93 | 8.93 | 0.09 | 0.735 | 44.64 | 39.29 |
| 65 | 16.07 | 5.36 | 33.93 | 0.00 | 44.64 | 0.00 | 0.00 | 0.09 | 0.735 | 44.64 | 39.29 |
| 66 | 16.07 | 5.36 | 14.29 | 0.00 | 16.07 | 32.14 | 16.07 | 0.09 | 0.800 | 64.29 | 19.64 |
| 67 | 16.07 | 5.36 | 21.43 | 9.52 | 28.57 | 9.53 | 9.53 | 0.00 | 0.780 | 57.14 | 26.79 |
| 68 | 16.07 | 5.36 | 22.32 | 0.00 | 45.00 | 5.63 | 5.63 | 0.09 | 0.778 | 56.25 | 27.68 |
| 69 | 16.07 | 5.36 | 25.00 | 0.00 | 0.00 | 49.11 | 4.46 | 0.00 | 0.769 | 53.57 | 30.36 |
| 70 | 16.07 | 5.36 | 25.00 | 5.36 | 0.00 | 44.46 | 3.75 | 0.00 | 0.769 | 53.57 | 30.36 |
| 71 | 16.07 | 5.36 | 25.00 | 0.00 | 2.68 | 48.21 | 2.68 | 0.00 | 0.769 | 53.57 | 30.36 |
| 72 | 16.07 | 5.36 | 25.00 | 0.00 | 10.71 | 37.50 | 5.36 | 0.00 | 0.769 | 53.57 | 30.36 |
| 73 | 16.07 | 5.36 | 25.00 | 0.00 | 13.39 | 26.79 | 13.39 | 0.09 | 0.769 | 53.57 | 30.36 |
| 74 | 16.07 | 5.36 | 25.00 | 13.39 | 26.79 | 0.00 | 13.39 | 0.09 | 0.769 | 53.57 | 30.36 |
| 75 | 16.07 | 5.36 | 25.00 | 18.75 | 34.82 | 0.00 | 0.00 | 0.00 | 0.769 | 53.57 | 30.36 |
| 76 | 16.07 | 5.36 | 25.00 | 0.00 | 34.82 | 0.00 | 18.75 | 0.09 | 0.769 | 53.57 | 30.36 |
| 77 | 16.07 | 5.36 | 25.00 | 8.04 | 37.50 | 0.00 | 8.04 | 0.09 | 0.769 | 53.57 | 30.36 |
| 78 | 16.07 | 5.36 | 25.00 | 13.39 | 40.18 | 0.00 | 0.00 | 0.09 | 0.769 | 53.57 | 30.36 |
| 79 | 16.07 | 5.36 | 25.00 | 0.00 | 49.11 | 0.00 | 4.46 | 0.00 | 0.769 | 53.57 | 30.36 |
| 80 | 16.07 | 5.36 | 25.00 | 0.00 | 49.11 | 4.46 | 0.00 | 0.09 | 0.769 | 53.57 | 30.36 |
| 81 | 16.07 | 5.36 | 25.00 | 13.39 | 0.00 | 37.50 | 2.68 | 0.09 | 0.769 | 53.57 | 30.36 |
| 82 | 16.07 | 5.36 | 26.79 | 8.63 | 25.89 | 8.63 | 8.63 | 0.00 | 0.763 | 51.79 | 32.14 |
| 83 | 16.07 | 5.36 | 27.68 | 0.00 | 5.09 | 40.71 | 5.09 | 0.09 | 0.760 | 50.89 | 33.04 |
| 84 | 16.07 | 5.36 | 27.68 | 0.00 | 22.90 | 25.45 | 2.54 | 0.09 | 0.760 | 50.89 | 33.04 |
| 85 | 16.07 | 5.36 | 27.68 | 0.00 | 25.45 | 15.27 | 10.18 | 0.09 | 0.760 | 50.89 | 33.04 |
| 86 | 16.07 | 5.36 | 27.68 | 0.00 | 30.54 | 15.27 | 5.09 | 0.09 | 0.760 | 50.89 | 33.04 |
| 87 | 16.08 | 5.36 | 22.33 | 0.00 | 14.02 | 28.14 | 14.07 | 0.09 | 0.778 | 56.23 | 27.69 |
| 88 | 16.29 | 2.71 | 17.65 | 10.55 | 31.67 | 10.56 | 10.56 | 0.00 | 0.795 | 63.35 | 20.36 |
| 89 | 16.29 | 2.71 | 35.75 | 7.54 | 22.62 | 7.54 | 7.55 | 0.00 | 0.735 | 45.25 | 38.46 |
| 90 | 16.36 | 5.45 | 27.27 | 6.36 | 24.55 | 15.45 | 4.55 | 0.00 | 0.757 | 50.91 | 32.73 |

TABLE IV-continued

Additional Alkali-Free Compositions

| | P | Al (oxide) | Al (fluoride) | Mg | Ca | Sr | Ba | Tm | F/F + O | R (total) | Al (total) |
|---|---|---|---|---|---|---|---|---|---|---|---|
| 91 | 16.51 | 5.50 | 19.27 | 9.78 | 29.36 | 9.79 | 9.79 | 0.00 | 0.780 | 58.72 | 24.77 |
| 92 | 16.51 | 0.00 | 28.44 | 0.00 | 45.87 | 0.00 | 9.17 | 0.00 | 0.769 | 55.05 | 28.44 |
| 93 | 16.51 | 5.50 | 28.44 | 8.26 | 24.77 | 8.26 | 8.26 | 0.00 | 0.750 | 49.54 | 33.94 |
| 94 | 16.67 | 5.56 | 27.78 | 6.48 | 25.00 | 13.89 | 4.63 | 0.00 | 0.750 | 50.00 | 33.33 |
| 95 | 16.98 | 5.66 | 28.30 | 6.60 | 25.47 | 12.26 | 4.72 | 0.00 | 0.743 | 49.06 | 33.96 |
| 96 | 17.31 | 5.77 | 28.85 | 6.73 | 25.96 | 10.58 | 4.81 | 0.00 | 0.735 | 48.08 | 34.62 |
| 97 | 17.39 | 8.70 | 21.74 | 0.00 | 52.17 | 0.00 | 0.00 | 0.00 | 0.750 | 52.17 | 30.43 |
| 98 | 17.65 | 5.88 | 29.41 | 6.86 | 26.47 | 8.82 | 4.90 | 0.00 | 0.727 | 47.06 | 35.29 |
| 99 | 17.86 | 3.57 | 25.00 | 8.93 | 26.79 | 8.93 | 8.93 | 0.00 | 0.750 | 53.57 | 28.57 |
| 100 | 17.86 | 3.57 | 23.21 | 9.22 | 27.68 | 9.22 | 9.23 | 0.00 | 0.756 | 55.36 | 26.79 |
| 101 | 17.86 | 3.57 | 26.79 | 8.63 | 25.89 | 8.63 | 8.63 | 0.00 | 0.744 | 51.79 | 30.36 |
| 102 | 17.86 | 3.57 | 28.57 | 8.33 | 25.00 | 8.33 | 8.34 | 0.00 | 0.737 | 50.00 | 32.14 |
| 103 | 17.86 | 3.57 | 21.43 | 9.52 | 28.57 | 9.52 | 9.53 | 0.00 | 0.762 | 57.14 | 25.00 |
| 104 | 18.00 | 6.00 | 30.00 | 7.00 | 27.00 | 7.00 | 5.00 | 0.00 | 0.719 | 46.00 | 36.00 |
| 105 | 18.18 | 5.45 | 12.73 | 10.60 | 31.82 | 10.61 | 10.61 | 0.00 | 0.778 | 63.64 | 18.18 |
| 106 | 18.18 | 5.45 | 24.55 | 8.64 | 25.91 | 8.64 | 8.64 | 0.00 | 0.740 | 51.82 | 30.00 |
| 107 | 19.57 | 6.52 | 21.74 | 8.70 | 26.09 | 8.70 | 8.70 | 0.09 | 0.727 | 52.17 | 28.26 |
| 108 | 19.57 | 6.52 | 21.74 | 0.00 | 52.17 | 0.00 | 0.00 | 0.00 | 0.727 | 52.17 | 28.26 |
| 109 | 19.64 | 1.79 | 25.00 | 8.93 | 26.79 | 8.93 | 8.93 | 0.00 | 0.732 | 53.57 | 26.79 |
| 110 | 20.00 | 13.33 | 20.83 | 0.00 | 45.83 | 0.00 | 0.00 | 0.00 | 0.696 | 45.83 | 34.17 |
| 111 | 20.34 | 5.08 | 23.73 | 8.47 | 25.42 | 8.47 | 8.47 | 0.00 | 0.714 | 50.85 | 28.81 |
| 112 | 21.40 | 7.12 | 22.43 | 0.00 | 49.05 | 0.00 | 0.00 | 0.00 | 0.696 | 49.05 | 29.55 |
| 113 | 21.43 | 0.00 | 21.43 | 9.52 | 28.57 | 9.53 | 9.53 | 0.00 | 0.727 | 57.14 | 21.43 |
| 114 | 21.43 | 2.68 | 18.75 | 9.52 | 28.57 | 9.53 | 9.53 | 0.00 | 0.727 | 57.14 | 21.43 |
| 115 | 21.43 | 0.00 | 23.21 | 9.22 | 27.68 | 9.22 | 9.23 | 0.00 | 0.721 | 55.36 | 23.21 |
| 116 | 21.43 | 0.00 | 25.00 | 8.93 | 26.79 | 8.93 | 8.93 | 0.00 | 0.714 | 53.57 | 25.00 |
| 117 | 21.43 | 5.36 | 19.64 | 8.93 | 26.79 | 8.93 | 8.93 | 0.00 | 0.714 | 53.57 | 25.00 |
| 118 | 21.43 | 0.00 | 25.00 | 0.00 | 53.57 | 0.00 | 0.00 | 0.00 | 0.714 | 53.57 | 25.00 |
| 119 | 21.43 | 5.36 | 25.00 | 8.04 | 24.11 | 8.04 | 8.04 | 0.00 | 0.692 | 48.21 | 30.36 |
| 120 | 23.08 | 23.08 | 7.69 | 7.69 | 23.08 | 7.69 | 7.69 | 0.00 | 0.667 | 46.15 | 30.77 |
| 121 | 24.00 | 16.00 | 12.00 | 8.00 | 24.00 | 8.00 | 8.00 | 0.00 | 0.667 | 48.00 | 28.00 |
| 122 | 24.79 | 9.92 | 7.44 | 9.64 | 28.93 | 9.64 | 9.64 | 0.00 | 0.700 | 57.85 | 17.36 |
| 123 | 26.09 | 5.22 | 7.83 | 10.14 | 30.43 | 10.15 | 10.15 | 0.00 | 0.700 | 60.87 | 13.04 |
| 124 | 26.09 | 5.22 | 12.17 | 9.42 | 28.26 | 9.42 | 9.43 | 0.00 | 0.684 | 56.52 | 17.39 |
| 125 | 26.09 | 0.00 | 21.74 | 0.00 | 52.17 | 0.00 | 0.00 | 0.00 | 0.667 | 52.17 | 21.74 |
| 126 | 26.09 | 5.22 | 18.70 | 8.33 | 25.00 | 8.33 | 8.34 | 0.00 | 0.657 | 50.00 | 23.91 |
| 127 | 26.09 | 5.22 | 21.74 | 7.83 | 23.48 | 7.83 | 7.83 | 0.00 | 0.643 | 46.96 | 26.96 |
| 128 | 26.09 | 5.22 | 24.35 | 7.39 | 22.17 | 7.39 | 7.39 | 0.00 | 0.630 | 44.35 | 29.57 |
| 129 | 26.09 | 5.22 | 14.79 | 8.96 | 26.96 | 8.98 | 8.99 | 0.00 | 0.674 | 53.90 | 20.01 |

3. Ultraviolet/Visible Spectroscopy—Photodarkening

A fluorophosphate glass sample was prepared in accordance with the fabrication parameters described above, having an area of about 1 cm×2 cm and a thickness of about 5 mm, to evaluate UV-visible spectroscopy. Experiments were conducted using a Cary 3E UV-Visible Spectrophotometer (Varian, Australia). The collection conditions were 1800 nm/min scan rate from 850 nm to 200 nm using a 1 mm×4 mm mask for both beams. After running a background, the sample was mounted on the sample holder so that the 5 mm thick section was aligned with the beam, and the sample spectrum was collected. The result is shown in FIG. 1, which depicts the absorbance ($cm^{-1}$) wavelength (nm).

The UV edge of a glass is generally defined as the wavelength at which the absorption is 1 $cm^{-1}$ above background. Preferably, the absorbance is relatively high for pump wavelengths (e.g., at about 780 nm or 670 nm, depending on the pump source used), because the pump wavelengths used for amplifying optical signals have generally shorter wavelengths than the optical signal itself. Thus, it follows that high pump power absorption (i.e., absorption at the pump wavelengths) is desired to improve the amplification efficiency of a given optical fiber.

Figure 1:
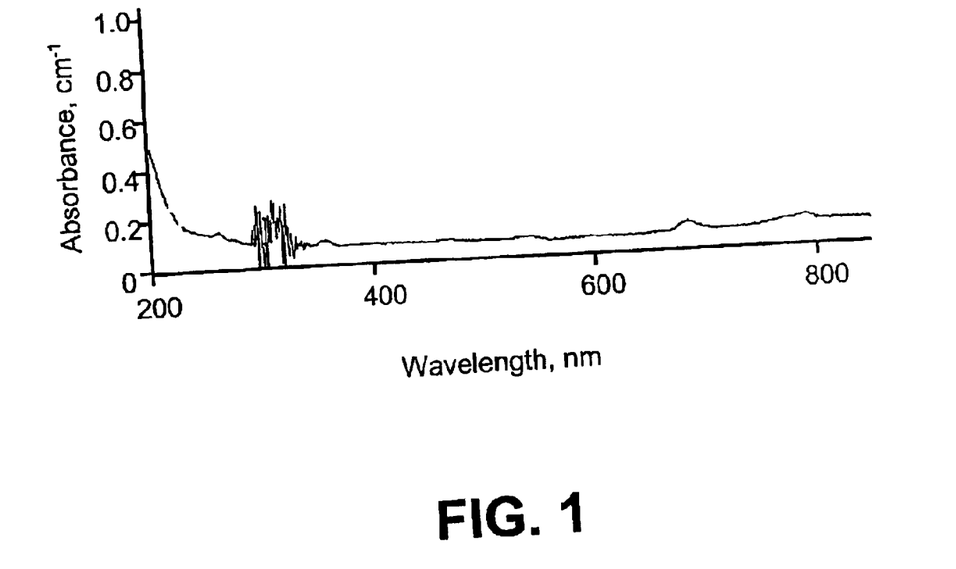
FIG. 1 is a plot of the UV-visible absorption spectrum for a Tm-doped fluorophosphate glass sample.

With respect to photodarkening, as can be seen from FIG. 1, the absorption edge for the sample is less than 240 nm, (for this sample, located at about 200 nm), which is comparable to the reported 220 nm band edge for ZBLAN. See e.g., Shahriari et. al., "Nd-doped Laser Glass Spectroscopic and Physical Properties," Lawrence Livermore National Laboratory M-95, Rev. 2, V. 2 (1981). Transition metal impurities can increase the UV wavelength absorbance, so higher purity aluminum metaphosphate and alkaline earth fluorides can be used to improve this result.

The inventors have discovered that the fluorophosphate glasses of the embodiments of the present invention do not suffer from substantially higher photodarkening than phosphate free fluoride glasses. Phosphate (i.e., $P_2O_5$) and phosphosilicate glasses have relatively high phonon energies compared to nearly standard fluoride glass (except for $BeF_2$ and beryllium-rich fluoroberyllates). The high phonon energies are used in Er-doped phosphosilicate amplifiers and laser fibers because the high phonon energy of $PO_4^{3-}$ anions around Er atoms shortens the 980 nm metastable emission lifetime, thereby increasing the upconversion to desired emission wavelengths. As increased upconversion in MCS fiber is directly related to increased photodarkening, and on that basis, additions of phosphate to a fluoride glass would be expected to increase the photodarkening as compared to a phosphate free fluoride glass, rendering the fluorophosphate glass as problematic as MCS fiber in the 1400 nm to 1530 nm range. However, as described above, the phosphate additions to fluoride glasses of embodiments of the present invention surprisingly do not substantially increase photodarkening in fluorophosphate glasses. As a result, optical amplifiers and/or lasers utilizing the fluorophosphate glass of the embodiments of the present invention can be pumped by conventional sources, without the need for complex pumping schemes designed to reduce the effects of photodarkening.

4. Infrared Spectroscopy

The inventors have determined that the relatively ionic nature of the fluorophosphate glass will produce an absorption at a wavelength comparable to or below that of MCS fiber, provided OH is not bonded to phosphorus. Therefore, it is highly desirable that OH levels be as low as possible.

Figure 2:
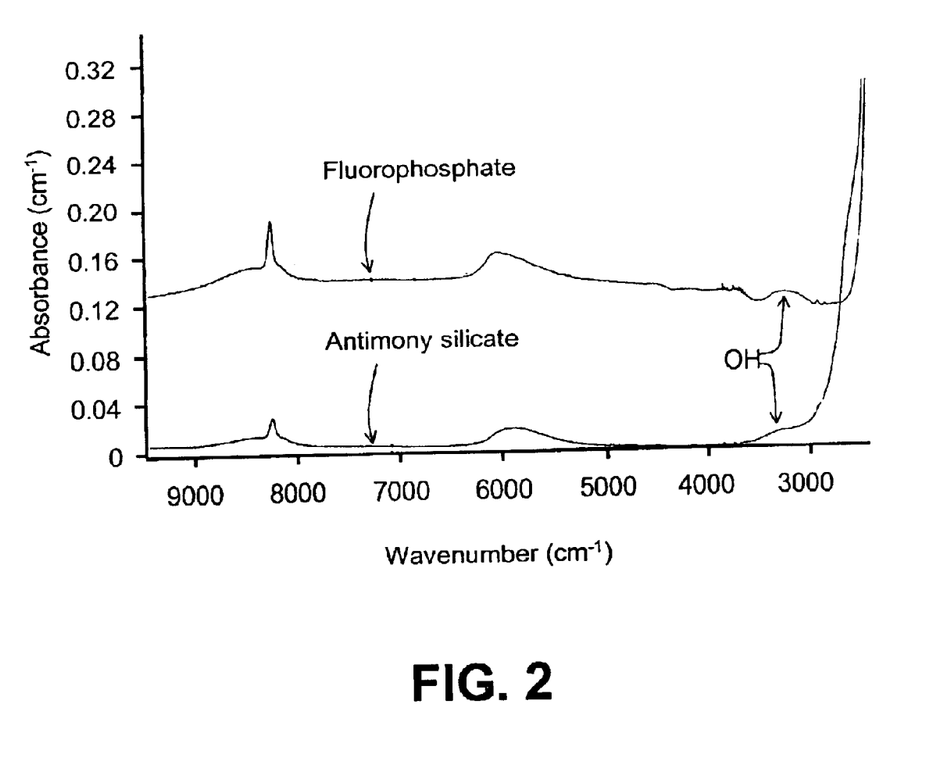
FIG. 2 is a plot of the IR absorption spectrum for a Tm-doped fluorophosphate glass sample.

The infrared spectrum can be used to analyze OH levels in glasses. The OH anion and molecular water ($H_2O$) have strong vibrational absorptions near 3500 $cm^{-1}$ in most oxide or fluoride glasses. The exact position varies with the make-up of the glass: it is generally near 3650 $cm^{-1}$ in v-$SiO_2$, and near 3350 $cm^{-1}$ in MCS fibers. The infrared spectrum of the sample used for UV-Visible spectroscopy was collected using a Nicolet Protégé 460 Fourier transform infrared spectrometer with a PbS detector. For comparison, an MCS glass of equivalent thickness and thulium doping-level was also run. The results of the experimental data is shown in FIG. 2.

As shown, the vibrational absorption near 3500 $cm^{-1}$ indicates the OH levels in the charted glasses. Thus, as can be seen in FIG. 2, the absorption at 3500 $cm^{-1}$ indicates that the OH levels of the fluorophosphate glass are sufficiently low. As such, FIG. 2 indicates a relatively low absorption of wavelengths in a desired transmission wavelength band of about 1400 nm to about 1530 nm.

5. Emission Characteristics for the 1480 Nm Transition

Figure 3:
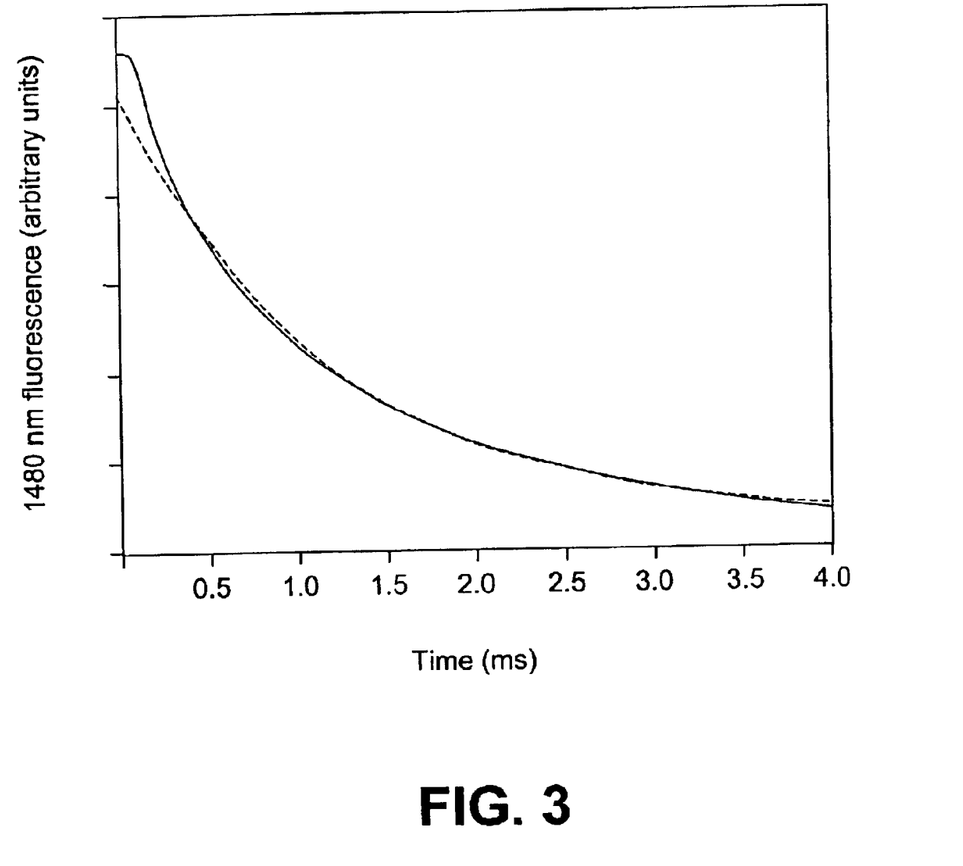
FIG. 3 shows a plot of the emission decay (lifetime) of the $Tm^{3+}$ 1480 nm transition (with exponential fit)

The $Tm^{3+}$ 1480 nm emission lifetime was measured to determine the estimated lifetime of an exemplary amplification wavelength in the range of about 1450 nm to about 1530 nm when pumped at a lower wavelength. The sample had a concentration of about 0.1 mol % $TmF_3$. The 1480 nm emission lifetime was measured using a Spex Fluorolog 240 spectrophotometer. The samples were pumped using a gated 800 nm diode laser, and intensity was measured using an indium-gallium-arsenide (InGaAs) detector operated at room temperature connected to an optical spectrum analyzer. Two decays were measured: (1) that of the 1480 nm emission line; and (2) that of the 1700 nm ground state transition. Lifetimes for these transitions were estimated using single-exponential fits, and are 1.16 ms for the 1480 nm transition and 3.79 ms for the 1700 nm transition. The 1480 nm decay curve and fit for the sample described above is shown in the graph of FIG. 3. The decay curve is slightly nonexponential, with a faster component at the onset of the decay with a lifetime of approximately 600 $\mu$s. Both values, however, are acceptable for efficient S-band amplifier applications. Concerning lifetime ranges, based on these results, Tm concentration levels can be varied within the preferred concentration ranges described above to yield a sample having a 1480 nm emission lifetime of about 350 $\mu$s to about 1.5 ms, or greater.

Figure 4:
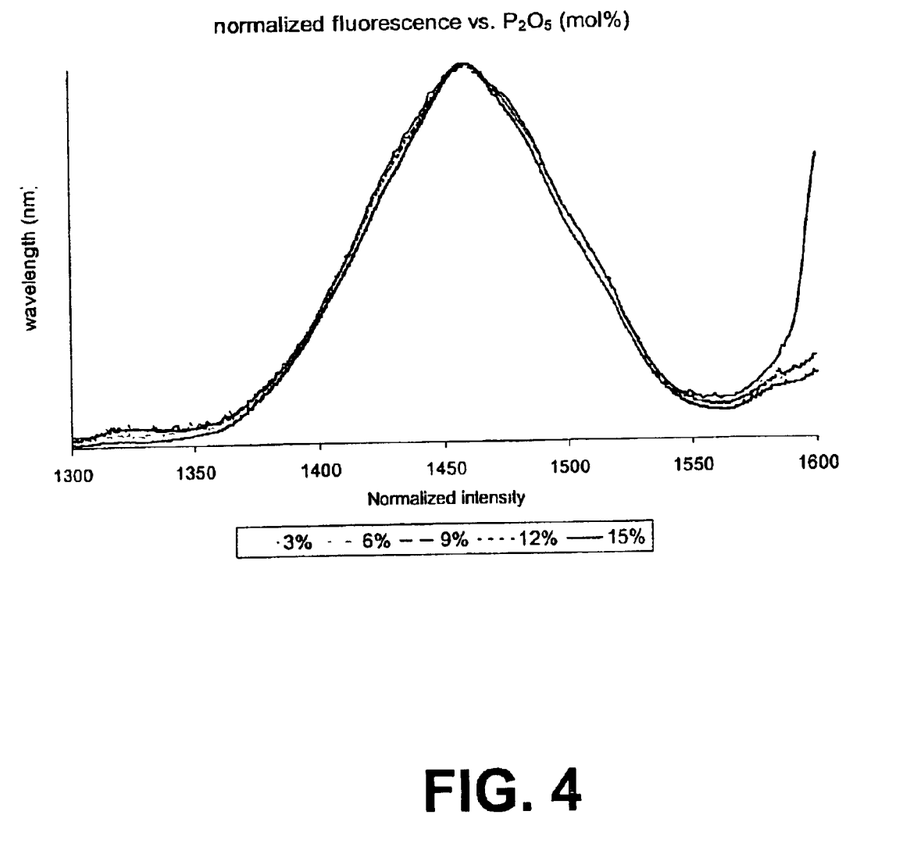
FIG. 4 shows a plot of the fluorescence spectra for example Tm-doped fluorophosphate glasses according to embodiments of the invention.

The bandwidth of the 1480 nm transition in a sample $Tm^{3+}$-doped fluorophosphate glass (about 0.1 mol % $TmF_3$) is illustrated in FIG. 4. As shown in FIG. 4, an emission bandwidth (as measured at full width at half maximum (FWHM)) of about 100 nm can be achieved, which would provide for acceptable amplification for a large portion of the S-band. As the inventors have determined, concentration levels of Tm and/or other host constituents can be selected to better optimize the lifetime and/or emission band width characteristics of the particular sample, depending on the desired application (e.g., amplifier or laser).

6. Glass Durability

Figure 5:
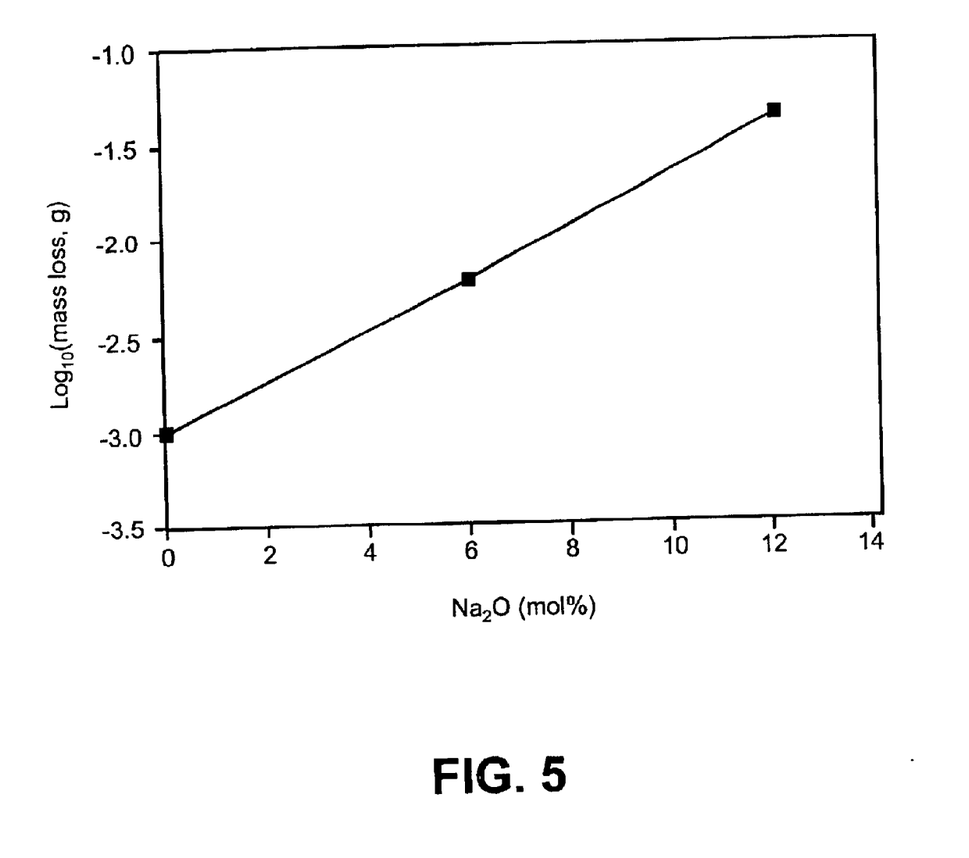
FIG. 5 shows a plot of the durability of Tm-doped fluorophosphate glass (in terms of mass loss) versus alkali concentration.

As the inventors have determined, alkali content can greatly affect the durability of the fluorophosphate glass. For example, FIG. 5 shows a graph of the durability of the glass (as measured in mass loss (on a log scale)) versus alkali metal content, here the concentration of Na (in the form of $Na_2O$) added to the fluorophosphate glass. In the sample, similar to that described below in a related durability experiment, $SrF_2$ is replaced by $Na_2O$. As indicated in FIG. 5, as sodium content is increased, the durability of the glass decreases (as represented by higher mass loss). Three samples fabricated as polished rectangular prisms (about 1 $cm^2$ in area) were prepared with varying sodium content. The samples were placed in deionized water heated to 50° C. and left overnight. These conditions were chosen to expose the rate limiting durability of the glass, as there was a large amount of solvent, a small surface area, and a short amount of time for a reaction to take place. It was expected that the data would vary exponentially with sodium content if it was a main factor in determining durability. As FIG. 5 shows, when plotted on a log scale, the results are linear, showing that increased sodium content leads to poorer durability. In fact, there was little or no measurable mass loss for the alkali-free sample (e.g., about 0.001 g or less). Further, the results show that improvement in glass durability can be achieved if alkali metal content is greatly reduced or substantially eliminated (e.g., in an alkali-free glass). Thus, according to an embodiment of the present invention, acceptable durability can be achieved with less than 10% alkali metal content, preferably at 5% or less, and more preferably when the fluorophosphate glass is alkali-free (i.e., containing no more than a trace amount of alkali metal).

For example, the inventors performed an additional experiment to show that alkali concentration can affect glass durability. In this experiment, the inventors prepared the following four sample glasses:

$$9\ P_2O_5+3\ Al_2O_3+30\ AlF_3+0\ NaF+7\ MgF_2+27\ CaF_2+19\ SrF_2+5\ BaF_2 \quad (1)$$

$$9\ P_2O_5+3\ Al_2O_3+30\ AlF_3+4\ NaF+7\ MgF_2+27\ CaF_2+15\ SrF_2+5\ BaF_2 \quad (2)$$

$$9\ P_2O_5+3\ Al_2O_3+30\ AlF_3+8\ NaF+7\ MgF_2+27\ CaF_2+11\ SrF_2+5\ BaF_2 \quad (3)$$

and $$9\ P_2O_5+3\ Al_2O_3+30\ AlF_3+12\ NaF+7\ MgF_2+27\ CaF_2+7\ SrF_2+5\ BaF_2. \quad (4)$$

In these samples, $SrF_2$ was replaced by varying amounts of NaF (e.g., sample (1) is alkali-free, sample (2) includes 4 NaF, etc.). The final mass varied from the starting masses by the following: mass difference=0.0 g (1); 0.000 g (2); 0.002 g (3); and 0.003 g (4). This mass difference (as calculated in $g/m^2$) corresponds to: 0.0 $g/m^2$ (1); 5.05 $g/m^2$ (2); 10.10 $g/m^2$ (3); and 15.15 $g/m^2$ (4). Thus, the presence of alkali metals in the fluorophosphate glasses of the present invention can lead to a decrease in durability. For comparison, Pyrex and window glass show zero mass loss in such a test.

APPLICATIONS

The compositions described above are suitable for use in fabricating Tm-doped optical fibers. Such optical fibers may have the compositions of the present invention formed into the core, with a similar composition formed as the cladding. In other embodiments of the present invention, a chemically dissimilar glass may be used as a cladding for a core formed from an above-described composition.

According to another embodiment of the present invention, an optical amplifier is provided. The optical amplifier includes a Tm-doped fluorophosphate glass material. The optical amplifier amplifies optical signals within the wavelength range of about 1450 nm to about 1530 nm, preferably about 1480 nm to about 1520 nm.

Figure 6:
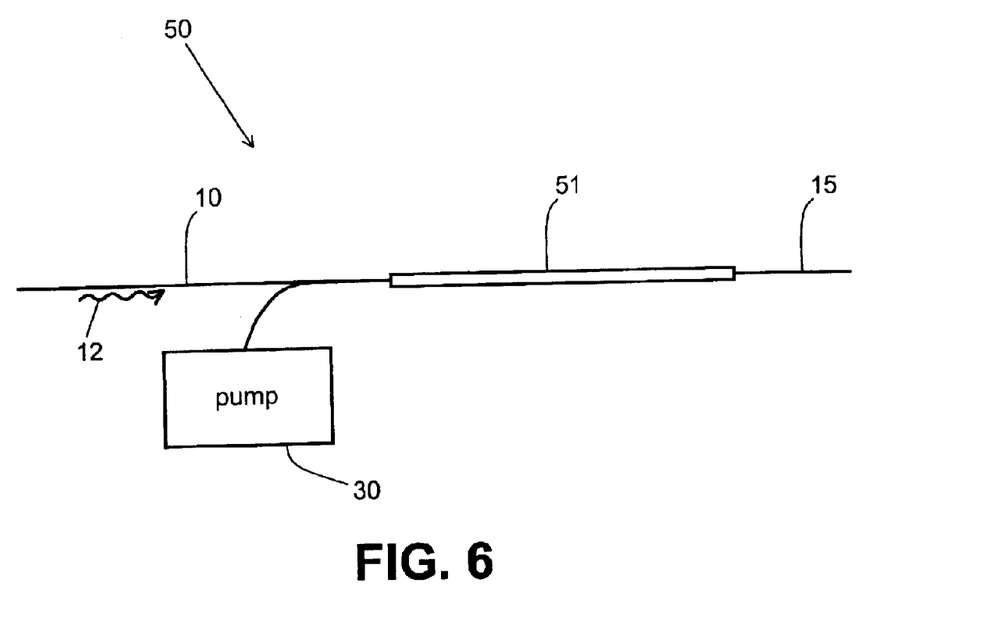
FIG. 6 shows a Tm-doped fluorophosphate glass material optical amplifier according to an embodiment of the invention.

FIG. 6 shows a schematic diagram of an optical fiber amplifier 50. Alternatively, as would be apparent to one of ordinary skill in the art given the present description, other constructions of optical amplifiers, such as slab amplifiers, can also be utilized in accordance with the Tm-doped fluorophosphate glass described herein.

As shown in FIG. 6, an input optical fiber 10 carries an optical signal 12 having a wavelength of about 1450 nm to about 1530 nm (e.g., a signal in the S-band). In this example, optical signal 12 has a wavelength of about 1480 nm. Fiber 10 and output fiber 15 can be conventional silica-based optical fibers. The optical signal 12 is amplified by an amplifying optical fiber 51. Optical amplification can be achieved over the wavelength range of interest using a Tm-doped fluorophosphate glass material, having a composition in accordance with the parameters described above. For example, amplifying optical fiber 51 can comprise a fluorophosphate glass material having a composition of about 0.1 mol % $TmF_3$, 7 mol % -11 mol % $P_2O_5$, about 2 mol % -4 mol % $Al_2O_3$, about 26 mol % -30 mol % $AlF_3$, about 44 mol % -65 mol % $RF_2$, and either about 5 mol % $LaF_3$, about 5 mol % $PbF_2$, or a mixture thereof to obtain index contrast relative to a $LaF_3/PbF_2$-free clad glass. Alternatively, a fluorophosphate glass material having a different composition can be utilized, in accordance with the parameters described above. Input fiber 10 and output fiber 15 can be optically coupled to amplifying optical fiber 51 using conventional fiber coupling techniques, as would be apparent to one of skill in the art given the present description.

In addition, the amplifying optical fiber 51 is optically pumped by a pump source 30, such as a conventional laser diode (or other solid state laser or lamp) operating in the 780 nm–800 nm wavelength region. Alternatively, an infrared Raman laser (or the like) can be used to pump both the $^3H_6$-$^3H_4$ and the $^3H_4$-$^3F_4$ absorption bands simultaneously, in order to prevent further possible deleterious up-conversion effects created when strongly pumping at 790 nm. Of course, any of a number of pumping schemes can be utilized so that the Tm-doped fluorophosphate glass material can efficiently absorb light from the pump source 30, depending on the particular absorption characteristics of the Tm-doped fluorophosphate glass material, as will be apparent to one of skill in the art given the present description. Accordingly, at least a portion of the light from pump source 30 is absorbed by the Tm-doped fluorophosphate glass material in amplifying optical fiber 51 in order to produce a population of Tm ions in the upper level of the 1480 nm transition. Optical amplification occurs through stimulated emission as is known. As a result, the optical signal 12 is amplified and the amplified signal is output along output fiber 15. The length of amplifying optical fiber 51 and the Tm concentration can be modified depending on the overall requirements of an optical system or network that amplifier 50 is incorporated.

Figure 7:
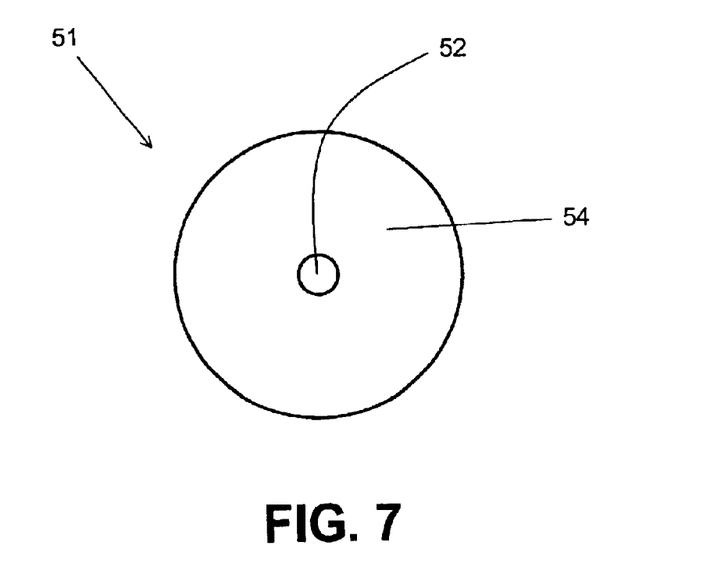
FIG. 7 shows a Tm-doped fluorophosphate glass fiber amplifier according to another embodiment of the invention.

As shown in FIG. 7, amplifying optical fiber 51 has a core 52 which includes the Tm-doped fluorophosphate glass material described previously. The Tm-doped fluorophosphate glass material can be drawn into fiber form using conventional fiber drawing techniques, such as the rod-in-tube technique. Fiber 51 also includes a cladding material 54, which can comprise a single cladding layer or, alternatively, cladding 54 can include an inner clad and an outer clad (not shown). The cladding material should be suitably indexed and can comprise a suitable conventional cladding material. In addition, the cladding material can comprise a similar fluorophosphate composition as does the core, but in concentration levels sufficient to provide a lower index of refraction than that of the core 52.

Thus, according to the preferred embodiments of the present invention, efficient, wide band optical amplification over the 14xx nm wavelength range, in particular, the 1450 mn–1530 nm wavelength band (e.g., the S-band) can be achieved utilizing Tm-doped fluorophosphate glass material.

Figure 8:
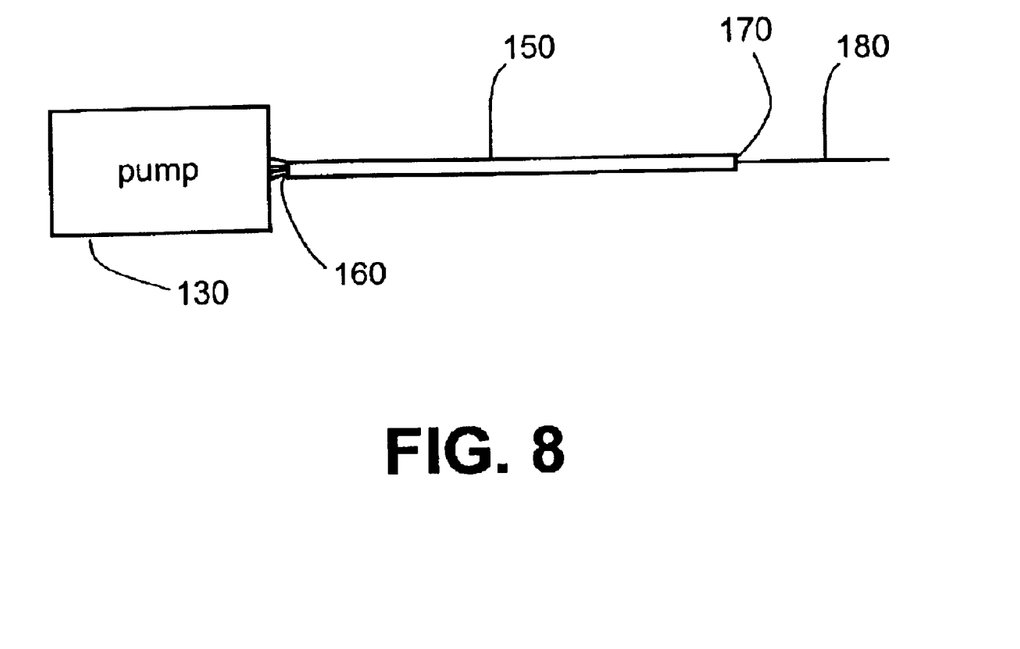
FIG. 8 shows a Tm-doped fluorophosphate glass fiber laser according to another embodiment of the invention.

In a further alternative embodiment, a laser is provided that incorporates the Tm-doped fluorophosphate glass described herein. FIG. 8 shows one aspect of this embodiment, a fiber laser 150. The fiber laser 150 includes Tm-doped fluorophosphate glass core having a composition in accordance with the parameters described above. The output of a pump source 130, such as an AlGaAs diode laser (e.g., with a 780 nm to 800 nm output), is propagated into a first end 160 of fiber laser 150 (e.g., by conventionally coupling fiber 150 to the output end of pump source 130). The first fiber end 160 has a mirror (either separate or coated onto end 160) with high transmission (e.g., 90% or greater) at the pump wavelength and very high reflection (e.g. close or at 100%) at the fiber laser output wavelength of interest (e.g., at about 1480 nm). The second end 170 of fiber laser 150 is optically coupled to (e.g. a separate mirror) or has incorporated therein (e.g., by end coating or Bragg reflector) an output coupler to provide partial reflection (e.g., 98% reflection) at the fiber laser output wavelength of interest. Output from laser 150 can be further propagated to an optical network via fiber 180. In use, the output of the fiber laser 150 can be modulated externally and coupled into a signal fiber incorporated in an optical network. Further, the output wavelength can be selected based on the fiber composition and/or mirror characteristics at ends 160 and 170, as would be apparent to one of ordinary skill in the art given the present description. In addition, the Tm-doped fluorophosphate glass laser host is not limited to a fiber design, but can be a slab or other form of solid state laser material.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

We claim:

1. A fiber comprising: a core including a glass material comprising a fluorophosphate glass having a $Tm^{3+}$ in a concentration between about 0.001 cation% and about 0.25 cation%, cation elements that include at least an alkaline earth, phosphorus, and aluminum, and anion elements that include oxygen (O) and fluorine (F), wherein a ratio of F/(F+O) is in the range of about 0.5 to about 0.8, wherein a lifetime of an upper level for a 1480 nm transition of the glass material is between about 350 µs to about 1.5 ms.

2. The fiber of claim 1, wherein the ratio of F/(F+O) is in the range of about 0.55 to about 0.8.

3. The fiber of claim 1, wherein an ultraviolet absorption band edge is no more than about 240 nm.

4. The fiber of claim 1, wherein a bandwidth of an upper level for a 1480 nm transition is from about 1410 nm to about 1510 nm as calculated as a full width at half maximum.

5. The fiber of claim 1, wherein the glass material is alkali-free.

6. The fiber of claim 1, wherein the glass material contains less than about 10 mol % alkali metal compounds.

7. A composition, comprising:
an alkali-free fluorophosphate glass having a concentration of $Tm^{3+}$ ions at an amount whereby the lifetime of an upper level for a 1480 nm transition is at least about 350 µs,
wherein the fluorophosphate glass comprises:
about 13 cation % to about 26 cation % P;
about 40 cation % to about 75 cation % R, where R comprises at least one alkaline earth fluoride;
about 5 cation % to about 50 cation % (total) Al; and
0.001 to about 0.5 cation % Tm.

8. The composition of claim 7, wherein the fluorophosphate glass comprises:
about 44 cation % to about 65 cation % R.

9. The composition of claim 7, wherein R includes one of Ca and Sr.

10. The composition of claim 7, wherein R includes both Ca and Sr.

11. The composition of claim 7, wherein the fluorophosphate glass comprises:
about 44 cation % to about 65 cation % R, and with less than 30 cation % (Mg+Ba);
about 13 cation % to about 40 cation % (total) Al, with less than 11 cation % Al that is incorporated from an oxide starting material; and
0.001 cation % to about 0.4 cation % Tm.

12. The composition of claim 7, comprising an additional rare earth element fluoride compound, wherein the additional rare earth element is an optically inactive rare earth element, at a non-zero concentration less than 12 cation %.

13. The composition of claim 7, further comprising, as calculated in mol percent:
a non-zero concentration of $PbF_2$ less than 10 mol %.

14. The composition of claim 7, wherein a bandwidth of an upper level of the 1480 nm transition is from about 1410 nm to about 1510 nm (as calculated as a frill width at half maximum).

15. The composition of claim 7, wherein an ultraviolet absorption band edge is at about 240 nm or less.

16. An optical amplification device, comprising:
a fluorophosphate glass having a concentration of $Tm^{3+}$ between about 0.001 cation% and about 0.5 cation%, cation elements that include at least an alkaline earth, phosphorus, and aluminum, and anion elements that include oxygen (O) and fluorine (F), wherein a ratio of F/(F+O) is in the range of about 0.5 to about 0.8 wherein a lifetime of an upper level for a 1480 nm transition of the glass material is between about 350 µs to about 1.5 ms; and
a pump source configured to output pump light having a wavelength corresponding to an absorption characteristic of the fluorophosphate glass to produce a population in an upper level of a 1480 nm transition.

17. The optical amplification device of claim 16, wherein an ultraviolet absorption band edge of the fluorophosphate glass is about 240 nm or less.

18. The optical amplification device of claim 16, wherein a bandwidth of an upper level for the 1480 nm transition is from about 1410 nm to about 1510 nm (as calculated as a full width at half maximum).

19. The optical amplification device of claim 16, wherein the fluorophosphate glass is alkali-free.

20. The optical amplification device of claim 16, wherein the ratio of F/(F+O) is in the range of about 0.55 to about 0.8.

21. The optical amplification device of claim 16, wherein the fluorophosphate glass having a non-zero concentration of $Tm^{3+}$ is a core for an optical amplifying fiber.

22. The optical amplification device of claim 21, further comprising:
a cladding disposed around said core, wherein the cladding material has a different composition than the fluorophosphate glass composition core.

* * * * *